No. 733,308.  
Patented July 7, 1903.

UNITED STATES PATENT OFFICE.

LUIS WIRTZ, OF LONDON, ENGLAND.

MANUFACTURE OF MATERIAL FOR USE IN THE PRODUCTION OF PIGMENTS.

SPECIFICATION forming part of Letters Patent No. 733,308, dated July 7, 1903.

Application filed September 29, 1902. Serial No. 125,305. (No specimens.)

*To all whom it may concern:*

Be it known that I, LUIS WIRTZ, a subject of the King of Spain, residing at 92 Tollington Park, London, England, have invented new and useful Improvements in the Manufacture of Material for Use in the Production of Pigments, of which the following is a specification.

This invention relates to the manufacture of a material chiefly designed for use in the production of coloring-matters, although it can also be used for other purposes.

According to the invention I take slag—such, for example, as ordinary blast-furnace slag—and I soak the said slag in a neutral or acid solution of a chlorid of a suitable metal—such, for example, as iron, zinc, or copper—or I may soak the slag in hydrochloric acid itself or in a mixture of any of the aforesaid chlorids and acid. In practice, however, for purposes of economy in manufacture I prefer to use such solutions as can be obtained commercially by stripping tin from tin-scrap and precipitating the tin by means of zinc with substitution of zinc chlorid for tin chlorid or by stripping galvanized-iron scrap or that obtained in the process of completely divesting imperfectly-cleaned scrap of any remaining traces of tin or zinc. The liquor obtained from the above-described soaking operation or the liquid obtained by washing the solid deposit therefrom is then filtered, and to the filtrate I add a solution of a suitable sulfate—such as iron, zinc, or copper—the two solutions being thoroughly mixed together and agitated. The product of the reaction which takes place on the mixing of the two liquids is a precipitate which can be separated out in any suitable manner, such as by filtration, and dried and ground. The characteristic features of the precipitate are the following—namely: It is of a whitish color, convertible to a reddish color on roasting. It is incombustible and insoluble in ordinary solvents and unattacked by most acids. It can be used as the basis of a paint and forms colors such as blue, green, and yellow by combination with certain potassium salts—such as ferrocyanid, ferricyanid, and bicarbonate—these colors possessing the general characteristics of Prussian blue and its derivatives.

Supposing the slag treated to be, for example, that obtained in the production of gray pig-iron for the Bessemer-steel process, the average composition of the slag would be silica, 31.46 per cent.; alumina, 8.50 per cent.; lime, 52.00 per cent.; ferrous oxid, 0.79 per cent.; manganese, calcic sulfate, &c., 7.25 per cent.; total, one hundred.

The slag for present purposes can be defined as a double silicate of lime and alumina represented approximately by the formula

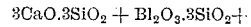

If slag of this composition be soaked in ferrous chlorid with an amount of free hydrocloric acid, it can be assumed that chlorids of lime and aluminium are formed, these being soluble, while the silica and other insoluble bodies remain behind. This reaction may be represented by the following equation:

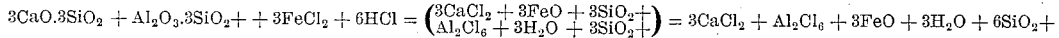

The insoluble $SiO_2$ with the other insoluble constituents of the slag remain in a solid mass or powder, while both the chlorids $CaCl_2$ and $Al_2Cl_6$, together with the ferrous oxid, dissolve in the liquid in which the slag is soaked or are incorporated with the washings of the slag. This liquid will have the following composition:

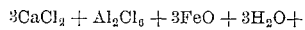

If treated with a solution of sulfate of iron alone, the chemical equation will be

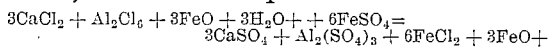

Of this body $CaSO_4$ is completely insoluble, $Al_2(SO_4)_3$ is only partially soluble, while the chlorid $FeCl_2$ and the oxid $FeO$ are soluble, so that the solid precipitate or white body obtained will have the following approximate composition:

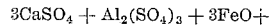

The oxid formed (ferrous oxid) will be found in an uncombined state and can be eliminated by sufficiently washing the precipitate in water. The same applies to the chlorid of iron or any other body (soluble) that may be incorporated with it at the time of its formation. Should the product be submitted to a protracted washing with water, experience proves that both the quantity of iron and alumina tend to disappear; but iron disappears (except in small traces) sooner than the alumina. This may be owing to the fact that the sulfate of alumina tends to form with the sulfate of calcium a double sulfate less soluble than the sulfate of alumina itself; also, that the quantity of sulfate of alumina present being larger than that of ferrous oxid the latter disappears first. Should the water be slightly acidulated with sulfuric or acetic acid, for example, the action is much more rapid. Should the water be alkaline—in solution carbonate of soda or potash, for example—the alumina and iron are precipitated together as a hydrate of alumina.

From the preceding equations it can be inferred what difference would be introduced in the body obtained in the case of soaking the slag in other liquids of the chlorid series or combinations of the same. If the chlorid used be that of zinc, for example, the chlorids formed with the slag will be, as above, chlorids of lime and aluminium, and a final sulfate of calcium and aluminium will be obtained, as before; but an oxid of zinc will take the place of oxid of iron. Should the oxid added be wholly or partly insoluble, it will be found incorporated with the final precipitate and impart to it other qualities. If hydrochloric acid alone be used, the hydrogen would either escape free or else combine with oxygen to form water.

Should the liquid used to precipitate the body from the soluble liquid resulting from the soaking of the slag be another sulfate in lieu of the sulfate of iron, the preceding equations will also serve to indicate the nature of the reactions which take place. For example, supposing sulfuric acid itself be used, the equation would be

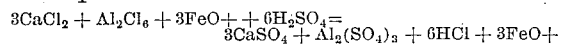

the products obtained and their sequence being the same, except that hydrochloric acid would be found instead of ferrous chlorid, and other less important bodies might be added to the final precipitate as a result of the action of the sulfuric acid on the other bodies contained in small quantities in the slag. Hydrochloric acid would, in fact, react on the ferrous oxid to form a chlorid; but owing to its being diluted the action is slow and most of the ferrous oxid is retained, sufficient remaining to give the product value as a pigment. The iron retained by calcination is oxidized, imparting its color to the whole mass. If the sulfate used be another sulfate, such as the sulfate of zinc, an additional chlorid of zinc instead of chlorid of iron will be found. If this latter is only partly soluble, it will become incorporated with the final precipitate obtained and modify its qualities.

Having now particularly described and ascertained the nature of my said invention and in what manner the same is to be performed, I declare that what I claim is—

1. The process of manufacturing a material for use in the production of pigments, which consists in soaking slag in a chlorid solution, separating the liquid therefrom, treating said liquid with a sulfate solution and separating the resulting precipitate, substantially as described.

2. The process of manufacturing a material for use in the production of pigments, which consists in soaking slag in a chlorid solution, separating the liquid therefrom, mixing therewith a solution of a sulfate of a suitable metal, and separating the resulting precipitate, substantially as described.

3. The process of manufacturing a material for use in the production of pigments, which consists in soaking slag in hydrochloric acid, separating the liquid therefrom, mixing therewith a solution of metallic sulfate, and separating the resulting precipitate, substantially as described.

4. A material for the production of pigments obtained by soaking slag, in a chlorid solution, separating the liquid, mixing therewith a sulfate solution, separating the resulting precipitate and drying it, substantially as described.

5. A material for the production of pigments formed by soaking slag in hydrochloric acid, filtering it, mixing with the filtrate a solution of a metallic sulfate separating the resulting precipitate and drying it, substantially as described.

LUIS WIRTZ.

Witnesses:
JOHN E. BOUSFIELD,
C. G. REDFERN.